2,984,657
PROCESS FOR THE POLYMERIZATION OF OLEFINS

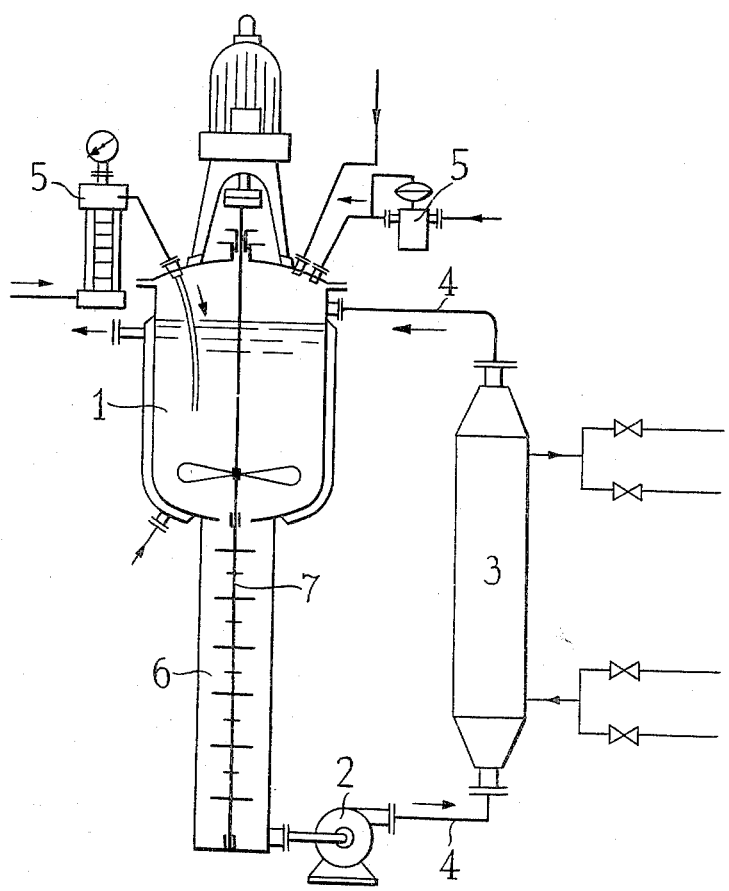

Werner Grundmann, Ditmar Bachmann, and Rudolf Halder, Hofheim (Taunus), Germany, and Hans Gampp, Sao Paulo, Brazil, assignors to Farbwerke Hoechst Aktiengesellschaft vormals Meister Lucius & Bruning, Frankfurt am Main, Germany, a corporation of Germany Filed Oct. 30, 1956, Ser. No. 619,268

Claims priority, application Germany Nov. 4, 1955

5 Claims. (Cl. 260—94.9)

This invention relates to a process for the polymerization of olefins and a device for performing that process; it relates to the polymerization of olefins according to a low-pressure process and, more particularly, to the polymerization of ethylene.

For the preparation of plastics it is known to obtain the polymer by introducing the monomer into a dispersion agent or a solvent containing substances which exercise a catalytic action. The polymerization takes place in a simple vessel provided with a stirrer; the reaction heat set free in the course of the polymerization can, in general, be passed through the jacket of the vessel to a cooling agent.

In the case of some plastics which require a higher polymerization heat, especially during the preparation of low-pressure polyethylene, the temperature below which the polymerization must take place and which has an influence on the quality of the material can only be maintained in the case of uneconomically small throughputs in apparatus which hardly exceed the technical scale. Attempts were made, by employing additional cooling installations, to absorb the quantities of heat which could no more be passed through the jacket, to adjust the proportion surface:contents—which is unfavorable in the case of large apparatus—and to obtain higher throughputs. These endeavors failed owing to the formation of deposits which rapidly led to an incrustation of the cooling surfaces and to an obstruction of the free passage sections on the side where the product was in contact with the heat exchanger. The incrustations could not be avoided by employing usual or obvious means, for example by installing polished cooling surfaces or by applying a high rate of flow.

Now we have found that olefins can be polymerized according to the low-pressure process, preferably, for example, according to the process described in the Belgian Patents Nos. 534,888, 533,362 and 534,792 by conveying the dispersion agent used during the polymerization, the monomer, the catalyst contained in the reaction mixture and the polymer which has been formed in the course of the reaction, from a reaction zone to a heat exchange zone and back from this zone to the reaction zone in a continuous current. Outside the reaction zone, the current of the reaction mixture is conducted under conditions at which no substantial polymerization takes place. It is surprising that, when carrying out the polymerization by the process of the invention, no deposits of polymer particles are formed on the cooling surfaces outside the reaction zone.

High throughputs in large apparatus operating on an industrial scale are obtained in a particularly simple manner by maintaining the continuously circulating current of the reaction mixture outside the reaction zone in a laminar state of flow. While hitherto in general efforts were made to attain turbulent conditions of flow in order to prevent the formation of incrustations on heat exchangers, these incrustations on the product side of the heat exchangers are avoided according to the process of the invention by creating conditions of flow which are characterized by Reynold numbers below 2000, because no polymerization takes place in this range of flow.

Although the heat transition numbers are much smaller in the laminar range than when employing turbulent conditions of flow, there are obtained—because the exchange surfaces on the product side are practically free from incrustations—heat transit numbers which are a multiple of the numbers obtained in the case of turbulent flow conditions and incrustated exchange surfaces. At any rate, the temperature in the reaction zone can be maintained within the set limits, for example at temperatures ranging from 10° C. to 150° C, preferably from 60° C. to 100° C., by regulating the quantity of cooling water with normal coolers. Much smaller coolers are sufficient if, in the continuously circulating current outside the reaction zone, according to the process of the invention, there lacks a component which is necessary for the polymerization because incrustations are not formed on the cooling surfaces and in the pipes in case of a turbulent circulation. Thus, for example, the monomer can be introduced into the reaction zone in a quantity such that the polymerization is almost terminated at the outflow of the reaction zone or, for example, a component of the catalyst can be added in such a small quantity that it is used up or almost used up at the outlet of the reaction zone. In any case, however, it is advantageous to install behind the reaction zone—possibly in the form of a turbulently agitated additional reactor—a zone in which any unreacted portions of the reactants or their components may react further until the reaction is completely terminated.

Owing to the process of the present invention, there may now also be chosen a continuous mode of operation which, hitherto, could not be employed on account of the immediately occurring incrustations. In this modification, the cycle may be tapped at any place, for example before or behind the cooling zone, in order to remove the suspension while the dispersing agent and the reactants may be replaced, for example, at the inlet of the reaction zone.

The accompanying drawing shows diagrammatically an example of an apparatus for carrying out the process of the invention. 1 is a vessel provided with a stirrer and a cooling jacket, 2 a circulating pump which can be regulated, 3 a switchable heat exchanger, 4 connecting pipes, 5 dosage devices, 6 an additional reactor, 7 a stirrer.

For the preparation of, for example, low-pressure polyethylene, the dispersing agent for the monomer and the substances exercising a catalytic action are introduced into the reactor 1 and heated to polymerization temperature by recycling them by means of pump 2 via the heat exchanger 3 which has been switched to "heating." Then a catalyst component is introduced into the turbulently agitated reactor. The second catalyst component is introduced simultaneously with the monomer. The heat exchanger is switched to "cooling."

As described in detail in the following examples, the further course of the polymerization can be controlled by the corresponding introduction of measured quantities of a reactant or by regulating the circulating quantity of the suspension.

The mode of carrying out the invention can be varied in different ways. In some cases, for example, the additional reactor can be dispensed with, especially if the device outside the reaction zone is used always in the laminar range. In another form of the method of the invention, the stirrer of the reactor can be separated from the stirrer of the additional reactor and each stirrer operated by itself. Moreover, the models of stirrers illustrated in the accompanying drawing may be replaced by other known models of stirrers. The essential feature is that a strong turbulence is attained over the whole area of the reaction zone or zones.

The following examples serve to illustrate the invention, but they are not intended to limit it thereto.

Example 1

About 6 cubic meters of a hydrogenated hydrocarbon fraction, boiling at a temperature of 202° C. to 230° C. under normal pressure, are introduced into a circulating apparatus which consists of a reaction vessel stirred at a rate of about 80 revolutions per minute and having a capacity of 8 cubic meters, a controllable circulating pump with a delivery of 16 to 40 cubic meters per hour, and a heat exchanger with a heat exchange surface of about 100 to 120 square meters. The hydrogenated hydrocarbon fraction is heated to 60° C. while being recycled. 10 millimols per liter of the dispersion agent titanium trichloride are introduced into the turbulently agitated reaction vessel as suspension in the aforementioned hydrocarbon fraction. Then there are added in measured quantities about 200 N cubic meters per hour of gaseous ethylene and 3 to 5 liters per hour of a solution of 2% strength of aluminum ethyl-sesquichloride in the same hydrogenated hydrocarbon fraction.

The temperature of the circulating current is kept at 60° C. by regulating the quantity of cooling water of the heat exchanger; the sections outside the reaction vessel through which the current flows are chosen such that the Reynold number remains below 2000.

After about 8 to 12 hours the titanium component of the catalyst is used up. The batch is discharged and a suspension is obtained which contains about 2000 kilos of polyethylene.

Example 2

2 cubic meters of a hydrogenated hydrocarbon fraction boiling at a temperature ranging from 202° C. to 230° C. under normal pressure are introduced into a circulating apparatus which consists of a vessel provided with a stirrer and having a capacity of 2.5 cubic meters, an additional reactor having an elongated, vertical form and a contents of 1 cubic meter, a controllable circulating pump with a delivery of 40 to 60 cubic meters per hour, and a heat exchanger with a heating surface of 5 to 10 square meters which can be switched from "heating" to "cooling." The hydrogenated hydrocarbon fraction is heated to 60° C. while being recycled. 10 millimols per liter of the dispersion agent titanium trichloride are introduced into the vessel as suspension in the aforementioned hydrocarbon fraction. At the same time there are added in measured quantities 50 N cubic meters per hour of gaseous ethylene and 1 to 3 liters per hour of a solution of 2% strength of aluminum sesquichloride in the same hydrogenated hydrocarbon fraction. By switching the heat exchanger to "cooling" and regulating the quantity of cooling water, the major part of the polymerization heat is evacuated and the temperature of the circulating current kept constant at about 60° C.

By regulating the inflow of ethylene, the course of the polymerization is controlled such that the reaction of the ethylene introduced into the vessel is almost terminated at the outlet of the additional reactor.

After about 10 to 12 hours, the titanium component of the catalyst is used up, the batch is discharged and a suspension is obtained which contains about 500 to 600 kilos of polyethylene.

We claim:

1. In a process wherein a lower olefinic monomer is continuously polymerized to a solid polymer by contacting it with a two-component catalyst wherein one component is a reduced compound of a heavy metal selected from the group consisting of titanium, zirconium, hafnium, vanadium, niobium, tantalum, chromium, molybdenum, tungsten, thorium and uranium and the second component is an organo-metallic compound, the reaction is conducted in an inert hydrogenated hydrocarbon in which the olefin monomer is soluble but the resulting polymer is insoluble, and the reaction zone is maintained at a temperature within the range of 10–150° C. by continuously recycling a stream of reaction effluent from the reaction zone through an external heat exchanger and returning at least a portion of the recycle to the reaction zone at a temperature sufficient to maintain the temperature of the latter within said range of 10–150° C., said recycled reaction effluent comprising the hydrocarbon dispersing agent, the monomer, the catalyst, and the polymer formed in the reaction zone, the improvement comprising avoiding the formation of polymer deposits on the heat exchanger walls by preventing further polymerization of the monomer within the heat-exchanger, this being achieved by maintaining in the heat exchanger a laminar flow characterized by a Reynold's number having a maximum of 2,000.

2. Process of claim 1 wherein a portion of the reaction effluent is withdrawn from the recycled system as polymer product.

3. Process of claim 1 wherein the olefin is ethylene.

4. In a process of polymerizing ethylene to polyethylene wherein gaseous ethylene is continuously contacted with a two-component catalyst wherein one component comprises a reduced compound of a heavy metal selected from the group consisting of titanium, zirconium, hafnium, vanadium, niobium, tantalum, chromium, molybdenum, tungsten, thorium, and uranium and the second component is an organo-metallic compound, and wherein the reaction medium is an inert hydrogenated hydrocarbon in which ethylene is soluble but polyethylene is insoluble, the improvement comprising conducting the polymerization as a continuous process by introducing ethylene and catalyst components into a reaction zone in the presence of said inert hydrogenated hydrocarbon, and maintaining the temperature of said reaction zone in the range between 10–150° C. by continuously removing a stream of reaction effluent from said reaction zone and passing it in laminar flow through an external heat exchanger zone, and recycling at least a portion of the said heat exchanged reaction effluent to said reaction zone, the Reynold's number of said reaction effluent being maintained at a maximum of 2,000 in the heat exchanger, within which range no ethylene polymerization occurs, and adjusting the temperature of the heat exchanger so as to maintain the temperature of the reaction zone in the range between 10 and 150° C., said reaction effluent comprising the hydrocarbon dispersing agent, the monomer, the catalyst present in the reaction mixture, and the polymer which has been formed.

5. In a process wherein a lower olefinic monomer is continuously polymerized to a solid polymer by contacting it with a two-component catalyst wherein one component is a reduced compound of a heavy metal selected from the group consisting of titanium, zirconium, hafnium, vanadium, niobium, tantalum, chromium, molybdenum, tungsten, thorium and uranium and the second component is an organo-metallic compound, the reaction is conducted in an inert hydrogenated hydrocarbon in which the olefin monomer is soluble but the resulting polymer is insoluble, and the reaction zone is maintained at a temperature within the range of 10–150° C. by continuously recycling a stream of reaction effluent from the reaction zone through an external heat exchanger and returning at least a portion of the recycle to the reaction zone at a temperature sufficient to maintain the temperature of the latter within said range of 10–150° C., the improvement comprising avoiding the formation of polymer deposits on the heat exchanger walls by passing the recycled steam in laminar flow through the heat exchanger and maintaining the Reynold's number of the recycled stream at a maximum of 2,000, said recycled stream comprising the hydrocarbon dispersing agent, the monomer, the catalyst, and the polymer formed in the reaction zone.

References Cited in the file of this patent

UNITED STATES PATENTS

| | | |
|---|---|---|
| 2,739,143 | Goering et al. | Mar. 20, 1956 |
| 2,755,324 | Mueller | July 17, 1956 |
| 2,780,617 | Zletz | Feb. 5, 1957 |

FOREIGN PATENTS

| | | |
|---|---|---|
| 533,362 | Belgium | May 16, 1955 |

OTHER REFERENCES

"Polyethylene" (Raff et al.), Interscience Publishers Inc., New York (1956), page 60, lines 1-4 relied on.